April 30, 1946.  J. J. WALSH  2,399,410

PROCESS OF MAKING SHOES

Filed March 25, 1944  2 Sheets-Sheet 1

INVENTOR:
JOHN J. WALSH,
BY
ATTORNEY.

April 30, 1946.  J. J. WALSH  2,399,410
PROCESS OF MAKING SHOES
Filed March 25, 1944  2 Sheets-Sheet 2
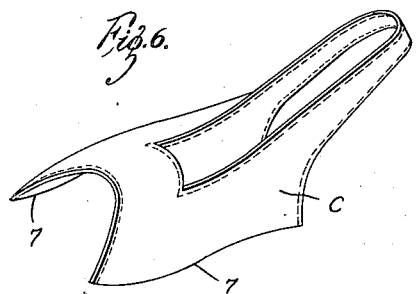
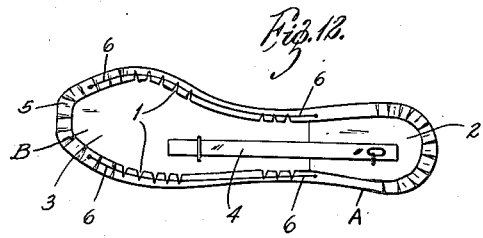
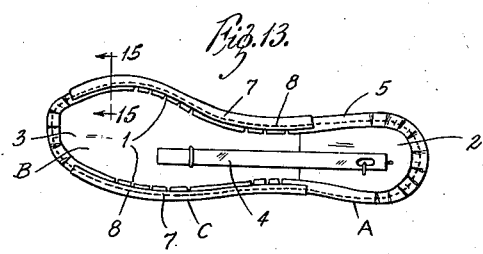
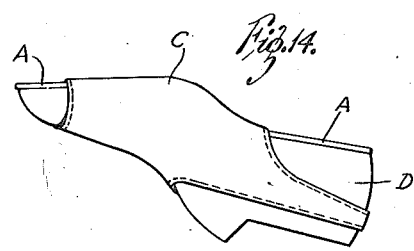
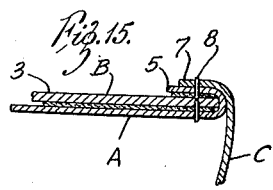
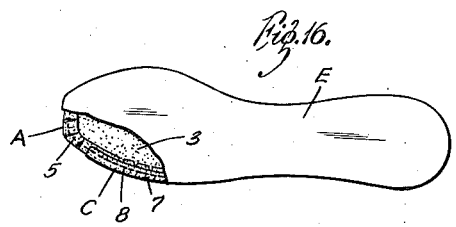
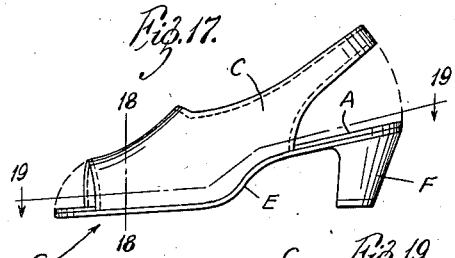
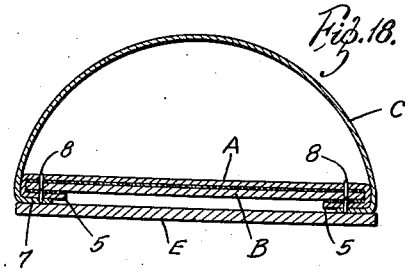
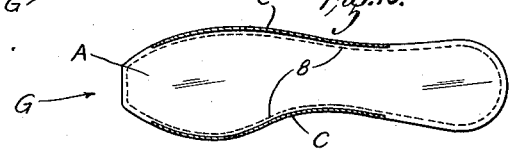
INVENTOR:
JOHN J. WALSH,
BY
ATTORNEY.

Patented Apr. 30, 1946

2,399,410

UNITED STATES PATENT OFFICE 2,399,410

PROCESS OF MAKING SHOES

John J. Walsh, Des Peres, Mo., assignor to Charles D. P. Hamilton, Jr., Charles D. P. Hamilton, III, Everett R. Hamilton, Forest Ross Hamilton, Albert J. Scheu, and John J. Walsh, a partnership doing business under the trade-name Penaljo Company, St. Louis, Mo.

Application March 25, 1944, Serial No. 528,079

2 Claims. (Cl. 12—142)

This invention relates to a new and useful improvement in a process of making shoes. The shoe disclosed herein is claimed in my copending application, Serial No. 528,078, filed March 25, 1944.

My invention has for its primary object the provision of a unique process for making shoes of so-called slip-last type readily with ease, accuracy, and precision and may be carried out by relatively unskilled workers with consequent savings in labor costs and the elimination of losses by reason of faulty and rejected shoes.

And with the above and other objects in view, my invention resides in the novel features of form, construction, arrangement, and combination of parts and in the unique steps or process of shoe production all presently described and pointed out in the claims.

In the accompanying drawings (two sheets),

Figures 1 to 6, both inclusive, illustrate in plan or perspective some of the elements, namely, the insole-cover, the upper, and the insole, employed in the construction, and forming part, of a shoe of my invention;

Figures 7, 8, and 9 illustrate the successive steps of permanently joining the insole cover of Figure 2 and the insole of Figure 5;

Figure 9:
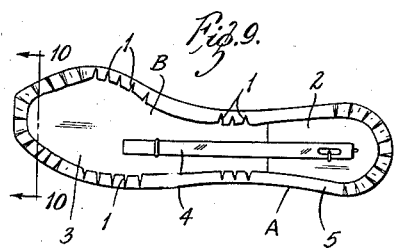

Figures 12, 13, and 14 illustrate the several process steps involved in joining the connected or unitary insole and insole-cover of Figure 9 and the upper of Figure 6;

Figure 15 is an enlarged fragmental sectional view taken approximately on the line 15—15, Figure 13, through the partially completed shoe;

Figure 16 is an inverted partly broken plan view of the partially completed shoe;

Figure 17 is a reduced side elevational view of a finished shoe constructed in accordance with and embodying my invention;

Figure 18 is a transverse sectional view through the finished shoe, taken approximately on the line 18—18, Figure 17; and Figure 19 is a sectional plan view of the finished shoe, taken approximately on the line 19—19, Figure 17.

Referring now more in detail and by reference characters to the accompanying drawings, which are illustrative both of a practical embodiment of a shoe of my present invention and of its method or process of manufacture or production, the present shoe is built up on an insole as a foundation, as it may be said, without the employment or use, during the first or initial steps of its production, of a last.

Figure 1:
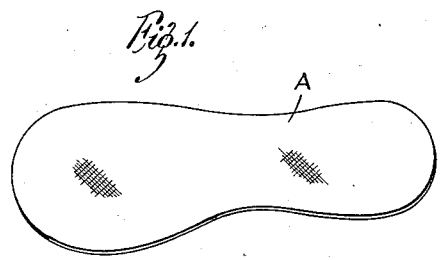
Figure 2:
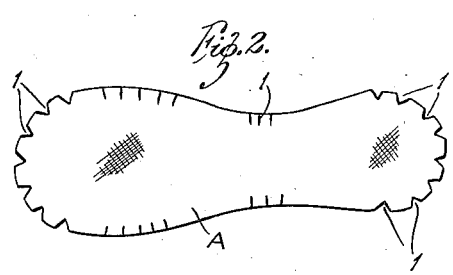
Figure 3:
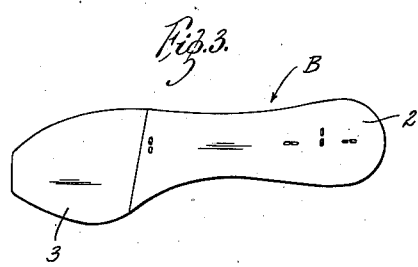
Figure 4:
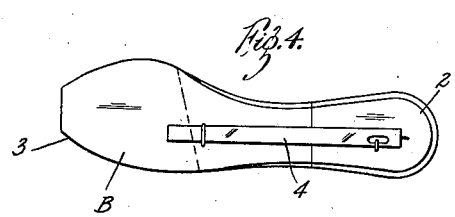

To such end, I preferably provide a section or piece A of cloth, thin leather, or other readily or easily flexible fabric or material cut to and having the general outline or contour and dimensions of the outer sole of the particular shoe being manufactured, as is best indicated in Figure 1.

Such material section A becomes, for neatness in interior view, as presently appearing and as it may now be designated, the shoe insole-cover, and to facilitate subsequent marginal underfolding of the insole-cover A on and about the shoe-insole, the cover A is preferably nicked or notched, as at 1, around the heel, the toe, and at the base of the ball and at other selected points along its margin.

Figure 5:
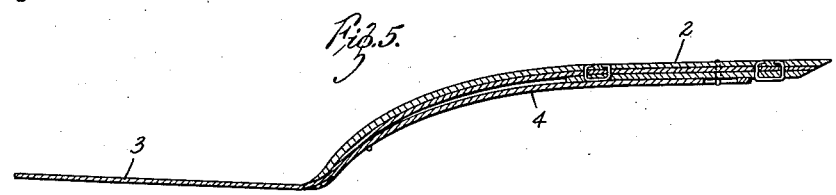
Figure 7:
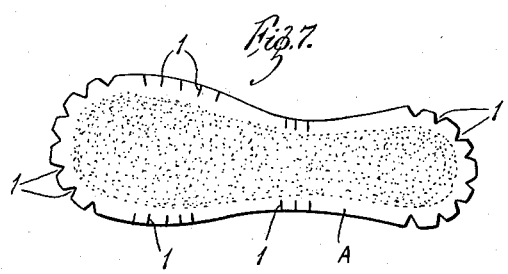
Figure 8:
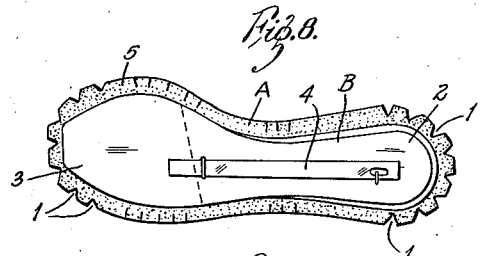
Figure 10:
Figure 10 is a transverse sectional view of the joined insole and insole-cover, taken approximately on the line 10—10, Figure 9.

B indicates an insole of any approved or standard type, which, as is customary, includes a heel and shank-portion 2 of fiber or other relatively stiff material lengthwise arcuated or curved, as best seen in Figure 5, to conform to the arch of the foot, and equipped with a forepart or ball-portion 3 of thin fiber-board or other suitable flexible or pliable material and equipped centrally and longitudinally on its under face with a suitable and correspondingly lengthwise curved shank-stiffener 4 of metal or other suitable rigid material. It will be understood, of course, that the insole B is approximately of the exact size and contour of the finished shoe and is then disposed, as indicated in Figures 8 and 9, on the under face of the insole-cover A and to which it is adhesively or otherwise permanently fixed throughout from toe to heel. As best seen in Figure 8, the insole-cover A is preferably of greater dimensions or area, as it may be said, than the insole B, and hence, when such insole-cover A and insole B are so fixed flatwise together, as also shown in Figure 8, the extended marginal cover-portion 5 is coated with adhesive and then folded under, and adhesively fixed to and upon the marginal under face of, the insole B, as indicated in Figures 9 and 10.

Depending then upon the desired size and contour of the shoe, the insole-cover A is suitably, by the operator or worker, marked or indexed, as at 6, 6, throughout, for the most part, the shank and ball-portion of its underfolded marginal portion 5, as indicated in Figure 12, so as to afford or provide a visual pattern for indicating to the operator the line of disposition in subsequently positioning the upper C, Figure 6, to, upon, and for connection with, the unit or joined insole-cover A and insole B.

In such connection, it may be remarked that the upper C, Figure 6, is first cut and otherwise constructed to approximately conform to the contour, shape, and size required in the finished shoe. Such upper C will, of course, comprise any suitable marginally flexible material and may, while in the present instance illustrated as of open heel and open toe type, shape, or design, equally well be of closed heel and closed toe or other selected type, shape, or design, and suitably surface embellished or ornamented. Suffice now merely to say that, as best seen in Figures 13 and 14, the opposite side marginal portions 7, 7, of the particular upper C are folded under and disposed upon the underfolded marginal portion 5 of the insole-cover A with their respective edges approximately along or in registration with the positioning lines 6, as indicated in Figure 13, and by means of a line of thread stitches, as at 8, projected vertically or at right angles through the insole-cover A, insole B, folded-under cover marginal portion 5, and upper marginal portion 7, as seen in Figure 15, fixed and joined to the joined insole B and cover A.

With the cover A, insole B, and upper C so joined one to the other, a last D of the proper size and contour, depending upon the desired size and contour of the finished shoe, is disposed within the upper B and upon the upper face of the insole-cover A, as indicated in Figure 14, and then an outer sole E of the desired contour, design, and shape is adhesively or otherwise fixed to and upon the insole B and over, and thereby concealing, the underfolded marginal portions 5 and 7 of the insole-cover A and upper C, as is best seen in Figures 17 and 18.

It will be understood, of course, that the shoe-parts or elements are permitted to stand from time to time during the production of the shoe to allow the adhesive or cementitious binding or securing material to dry and harden, and in due course a heel F is suitably affixed to and upon the under face of the outer sole E, when the finished shoe G illustrated in Figure 17 results, a shoe which, in production and in form, fit, and appearance meets and fulfills the objects stated.

Figure 11:
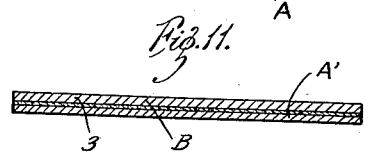
Figure 11 is a view similar to Figure 10 of a slightly modified form of joined insole and insole-cover.

I may add that, if the upper of the particular shoe be of the closed heel and closed toe type, as indicated in dash-lines in Figure 17, the marginal insole-underfolding of the cover A may be omitted, as indicated in Figure 11, the cover A' merely extending over the upper face of the insole B, in which event, the pattern lines 6, 6, will be laid directly on the under face of the insole B, and it is to be understood that other changes and modifications in the form, construction, arrangement, and combination of the several parts of the shoe, as well as changes also in its steps of manufacture or production may be made and substituted for those herein shown and described without departing from the nature and principle of my invention.

Having thus described my invention, what I claim and desire to secure by Letters Patent is:

1. That process of shoe production which includes the provision of an insole having the contour of the finished shoe, providing an upper having the approximate dimensions and shape of the finished shoe, folding the upper marginally under the insole and stitching the folded-under marginal portion of the upper to and upon the under face of the insole while the parts are unassembled on a last, then, disposing a last within the upper and upon the insole, and then adhesively securing an outer sole to and upon the outer face of the insole in such manner as to conceal therebetween the underfolded marginal portion of the upper.

2. The process of manufacturing a shoe which includes the following steps in sequential order: providing an insole having a contour substantially similar to the contour which the sole of the shoe will have when the shoe is finished, providing an insole cover having a shape similar to, but larger than, the insole so as to have a continuous peripheral overlapping portion, adhesively securing said cover to the upper face of the insole over substantially the entire area of contact therebetween, folding over the marginal portion and adhesively securing same to the under face of the insole, providing an open-toed and open-heeled upper, folding the peripheral margins of the ball portion of the upper over and upon the under face of the covered insole in such a manner that the folded-over margins of the upper overlie the folded-over margins of the insole cover, and finishing the upper-insole combination by forming a single line of stitches continuously around the peripheral margin of the covered insole through the folded-over margins of the insole cover and the upper.

JOHN J. WALSH.